United States Patent
Nagornov (10) Patent No.: US 9,470,507 B2
(45) Date of Patent: *Oct. 18, 2016

(54) VEHICLE WHEEL ALIGNMENT METHOD AND SYSTEM BASED ON GYROSCOPIC SENSORS OR ANGULAR RATE SENSORS OR MEMS ANGULAR RATE SENSORS

(71) Applicant: Vladimir Nagornov, Kotelniki (RU)

(72) Inventor: Vladimir Nagornov, Kotelniki (RU)

( * ) Notice: Subject to any disclaimer, the term of this patent is extended or adjusted under 35 U.S.C. 154(b) by 246 days.

This patent is subject to a terminal disclaimer.

(21) Appl. No.: 14/332,595

(22) Filed: Jul. 16, 2014

(65) Prior Publication Data

US 2016/0018209 A1    Jan. 21, 2016

(51) Int. Cl.
  *G01B 7/30*    (2006.01)
  *G01B 7/315*   (2006.01)

(52) U.S. Cl.
  CPC .......... *G01B 7/315* (2013.01); *G01B 2210/20* (2013.01)

(58) Field of Classification Search
  CPC . G01B 5/255; G01B 2210/28; G01B 11/275
  USPC ...................................... 33/203.18
  See application file for complete search history.

(56) References Cited

U.S. PATENT DOCUMENTS

| 4,690,557 A * | 9/1987 | Wiklund ............ G01B 11/2755 33/288 |
| 7,040,029 B1 * | 5/2006 | Hillman ............... G01B 11/275 33/203.12 |
| 7,100,289 B1 * | 9/2006 | Strege .................... G01B 7/315 33/203 |
| 9,157,724 B2 * | 10/2015 | Nagornov .............. G01B 21/26 |
| 2009/0271137 A1 * | 10/2009 | Torri ...................... G01B 21/26 702/104 |
| 2013/0297150 A1 * | 11/2013 | Kim ......................... B62D 6/00 701/41 |
| 2016/0018209 A1 * | 1/2016 | Nagornov .............. G01B 5/255 33/301 |

* cited by examiner

*Primary Examiner* — Yaritza Guadalupe-McCall
(74) *Attorney, Agent, or Firm* — Nadya Reingand (57) ABSTRACT

The invention relates to a method and system for determining vehicle wheel alignment, and namely camber angles, total and individual toe and front wheel steering axis caster and steering wheel axle tilt angle, by measuring changes in wheel sensor angles from a predetermined (i.e. control) position. Changes are measured using gyroscopic sensors or angular rate sensors or MEMS angular rate sensors (MEMS gyroscopes).

16 Claims, 5 Drawing Sheets

VEHICLE WHEEL ALIGNMENT METHOD AND SYSTEM BASED ON GYROSCOPIC SENSORS OR ANGULAR RATE SENSORS OR MEMS ANGULAR RATE SENSORS

CROSS-REFERENCE TO RELATED APPLICATIONS

This patent application claims priority to U.S. patent application Ser. No. 14/123,567 filed on Dec. 3, 2013, which is National phase application of PCT/RU2012/000876 filed on Oct. 26, 2012, and incorporates fully by reference,

FIELD OF THE INVENTION

This invention relates to a method and system for determining vehicle wheel alignment, namely camber angles, total and individual toe, front wheel steering axis caster and steering wheel axle tilt angle.

BACKGROUND OF THE INVENTION

A known method and system are based on the measurement of wheel alignment using electronic and optoelectronic sensors with the necessary stability in the given range of measured parameters that are mounted directly on the wheel. The method is based on the application of electronic and optoelectronic sensor systems that form measuring units mounted on wheels of the vehicle. Measurement results obtained with measuring unit sensors are processed using the microprocessor system. Data from the preprocessing system is transmitted to a personal or industrial computer for final processing and information display. The measurement process is controlled from a computer or directly from wheel sensors. The method ensures simultaneous control of all wheel angles. Measuring units contain a set of Charge-coupled devices (hereinafter—CCD) sensors for measuring angles in horizontal plane (toe-in). Tilt sensors (inclinometers) are used to measure vertical angles in the longitudinal (steering wheel axle caster angle) and transverse (camber angle and steering wheel axle tilt angle) direction. The main disadvantages of the method are: the complexity of measuring units and, as a consequence, a long time required to mount them on the wheels, high power consumption by wheel measuring unit sensors, low impact resistance of sensors, and the requirement to align and center measuring units to the wheels of the vehicle.

Known methods and system are based on the use of computer vision. Measurements are taken by processing measured data obtained with flash light emitters on special targets placed on the wheels of the vehicle and reading radiation pulses reflected from targets with video cameras. Video cameras and emitters are built using CCD technology. Measurement results obtained with video cameras are processed using the microprocessor system. Measurement results are processed and returned using a personal or industrial computer to be installed separately. The main disadvantages of the method are: restrictions on spatial system configuration and sizes of the tested vehicles imposed to ensure target visibility by video cameras.

Another known method and system of determining vehicle wheel alignment based on a gyroscopic sensor is disclosed in U.S. Pat. No. 5,038,485, filed Aug. 13, 1991 (METHOD AND APPARATUS FOR MEASUREMENT OF WHEEL ALIGNMENT). The method and system are based on using one single portable angle measurement instrument which is connected to a stationary unit. The angle measurement instrument includes a gyroscope unit connected to an angle measurement device. By applying the angle measurement instrument subsequently to each of the wheels of the vehicle to be measured, the respective angles between the wheel and a directionally stable axis of the gyroscope unit itself are measured and are stored in memories. Subsequently the desired wheel alignment parameters are calculated by processing the measurement values stored in the memories by means of calculation circuitries and are displayed in the display unit. Reference direction of the gyroscope at first is adjusted at one of the wheels, preferably a rear wheel, at a selected part of the vehicle or the reference basis and then unchanged until the end of the measurement. The main disadvantages of this method are: Use of one gyroscopic measurement unit doesn't offer capability to see the mutual alignment angle changing in the case of wheel adjustment. Total wheel alignment measurement in this case, further taking into account each wheel's curve compensation, is a long, complicated procedure that requires a precise and complex sequence of actions and thus is not capable of adjustment of wheel angles or real time alignment tracking.

Yet another known method and system of determining vehicle wheel alignment based on a gyroscopic sensor is disclosed in U.S. Pat. No. 7,089,150 B2 and U.S. Pat. No. 7,324,916. The method and system are based on the measurement of the wheel alignment, using gyroscopic sensors based on calculating changes in the angles from an initial surface located on the vehicle. The system includes a gyro sensor, which can be rigidly connected with inclinometers on two orthogonal axes, as well as an electronic computer system and interface with the operator. It assumes an initial vehicle measurement point with a known position relative to the vehicle wheels. In general, during the initialization of the reference point, tilt sensors (inclinometers) are set to zero, or the computer system compensates for further measurements when calculating the slope of the gyroscopic sensor. In general, after initialization, it is suggested to install the sensor on the measured wheel, and obtain the value of the angles of the wheels by calculating the change of angles relative to the initial position. The main disadvantages of this method are: the lack of publicly available vehicle control points data, which could serve as data for starting points for measurement; not all vehicles can be used for measuring the control points, because they are not available without additional work to dismantle parts of the vehicle; the complexity of regulating wheel alignment with one sensor, taking in account each wheel's curve compensation, the reason being that the angles of the wheels are dependent and quick and accurate regulation requires constant monitoring of the angle values at the axle of the vehicle. It must also be noted that the patent's conclusions on the calculation of the individual wheel alignments are incorrect. This system can only measure total alignment using two sensors on the axle after their initialization at one control point or after the measurement of both wheels with one sensor sequentially, as at the initialization at the control point, there is not a defined line for the gyroscopic sensor with respect to which the toe is regulated.

SUMMARY OF THE INVENTION

Disclosed herein is a method for determining a vehicle's wheel alignment, comprising placing at least two angular sensors on sensors' mounting sites located on a reference plane (with a known mutual orientation of sensors' mounting sites), each angular sensor measuring an angle change in at least two of three, X, Y and Z, orthogonal coordinate axes;

recording values of at least two (in X,Y or X, Z or Y,Z) reference angles of each sensor, the at least two reference angles showing a relative position of each sensor to a known common plane of the reference plane; based on the relative position of the sensors to the known common plane, calculating relative angles between the sensors in at least two orthogonal coordinate axes (in X,Y or X, Z or Y,Z); the reference plane is disconnected from the vehicle; removing the sensors from the reference plane (which is not connected to the vehicle) and placing them on the wheels of the vehicle, wherein one sensor is located on each measured wheel; and based on the sensors' measured angle change, calculating and recording a relative angular position of the sensors, thus determining the vehicle's wheel alignment.

In one aspect, the sensors are gyroscopic sensors. In another aspect, the sensors are angular rate sensors, and they perform an angular rate measurement continuously starting from removal from the reference plane to placement on the wheels, and such sensors process the angular rate measurement to perform a continuous integration of the angle over time to obtain a current (instantaneous) angular position of the sensor relative to a starting position.

In some aspects, the processing unit is positioned inside the sensor. In another aspect, the method further comprises transmitting wirelessly an angle change measurement data to a remotely located processing unit. In some aspects, the method further comprises placing at least one inclinometer on the reference plane, measuring an inclination of the known common plane of the reference plane relative to the Earth's surface, based on a known relative position of the sensors to the common plane, calculating starting point inclination angles of each sensor on the reference plane to the Earth's surface; and after placing the sensors on the wheels, based on the sensors' measured angle change relative to starting point inclination angles, calculating and recording a wheel inclination relative to the Earth's surface (camber).

In some aspects, each sensor may have an inclinometer to define its starting point inclination angle during the sensor's positioning on the reference plane.

In some aspects, the method comprises further using at least one additional frame sensor; the frame sensor being the same type as other sensors; the frame sensor being initially placed on the reference plane simultaneously with other sensors; recording values of at least two (in X,Y or X, Z or Y,Z) reference angles for the frame sensor, the at least two reference angles showing a relative position of the frame sensor to a known common plane of the reference plane; based on the relative position of the sensors to the common plane, calculating relative angles between the frame sensor and other sensors in at least two orthogonal coordinate axes (in X,Y or X, Z or Y,Z); removing the frame sensor from the reference plane and placing it onto a vehicle frame; and based on the frame sensor's and other sensors' measured angle changes, calculating and recording a relative angular position of the frame sensor and other sensors, thus determining the vehicle's wheel alignment in reference to the vehicle frame.

A device for determining a vehicle's wheel alignment, used in accordance with the method above, is also disclosed herein. The device, in general, comprises at least two angular sensors for placement on sensors' mounting sites located on a reference plane (with a known mutual orientation of sensors' mounting sites), each angular sensor measuring an angle change in at least two of three, X, Y and Z, orthogonal coordinate axes; a storage unit for recording values of at least two (in X,Y or X, Z or Y,Z) reference angles of each sensor, the at least two reference angles showing a relative position of each sensor to a known common plane of the reference plane; a processing unit for calculating relative angles between the sensors in at least two orthogonal coordinate axes (in X,Y or X, Z or Y,Z) based on the relative position of the sensors to the known common plane, wherein the sensors are removed from the reference plane and placed on the wheels of the vehicle, wherein one sensor is located on each measured wheel; and wherein, based on the sensors' measured angle change, the processing unit calculates and records in the storage unit a relative angular position of the sensors, thus determining the vehicle's wheel alignment. The device may be designed to additionally include elements such as, but not limited to, gyroscopic sensors, angular rate sensors, a transmitting unit for wireless data transmission, at least one inclinometer, and at least one additional frame sensor.

BRIEF DESCRIPTION OF THE DRAWINGS

FIG. 2 shows an example of the wheel alignment determination system. The system consists of the following elements: four wheel sensors 6; reference plane 7; reference plane electronic circuit with transmitting device 8; reference plane MEMS accelerometer 9; computer (processor/processing unit) 10.

DETAILED DESCRIPTION OF THE PREFERRED EMBODIMENT

Definitions

"Reference plane," as used herein, is defined as a part of a control mechanism to create a value with which to compare measured data. Mutual changes in the wheel sensors' angles are measured relative to a position predetermined using the reference plane. The reference plane is a precision surface to define a common plane to measure the mutual changes in the spatial position of all system wheel sensors. The reference plane is not part of the measured vehicle. These changes are measured using gyroscopic sensors or angular rate sensors or MEMS angular rate sensors (MEMS gyroscopes).

The present invention comprises a method and device to determine vehicle one or more wheel alignment angles, namely camber angles, total and individual toe, front wheel steering axis caster, and steering wheel axle tilt angle, by simultaneously measuring the mutual changes in wheel sensor angles from a reference plane value. Changes are measured using gyroscopic sensors or angular rate sensors or gyroscopic MEMS angular rate sensors (MEMS gyroscopes). To determine the initial predetermined values of mutual wheel sensors angles, the reference plane is used with or without (in case only toe angles measures) known inclination angles, wherein the reference plane is not a part of the measured vehicle. The reference plane serves to define a common plane of reference for all system sensors. The reference plane inclination is measured at the initial installation of the wheel alignment determination system or alternatively constantly measured using a set of inclinometers and/or accelerometers that are fixed to the reference plane. The reference plane provides a common plane of reference for each system sensor, and during alignment, a measurements system constantly calculates the mutual angle between the reference plane and a corresponding sensor, thus the mutual angle between all system sensors is calculated. Before starting wheel alignment measurements, the wheel sensors are mounted on the reference surface at special mounting sites, which have a known orientation relative to the reference plane. The system remembers the spatial position of these wheel sensors and, since the reference plane inclination is known, the system calculates the absolute plane inclination of wheel sensors and the angles of their mutual arrangement in space. When removing wheel sensors from the reference plane and mounting them to the wheels of the vehicle, the system, based on changes in readouts from gyroscopic sensors or angular rate sensors or gyroscopic MEMS angular rate sensors (MEMS gyroscopes), calculates the angles of the mutual sensors' planes. In the case where corresponding wheel and sensor planes are parallel, the angle of mutual wheels' planes can be calculated; otherwise, the angle between corresponding wheel and sensor planes must be defined for finding the angle of mutual wheels' planes. Also, the wheels' curve (runout) can be compensated for via averaged results, which must be taken into account for total wheel alignment adjustments. This can be performed by rolling the vehicle in its rectilinear motion, where based on the relation of the changes in the sensors planes inclination, wheel inclination plane is calculated as an average value and wheel curve (runout) also is adjusted based on the dependence of changes in the sensors' plane inclination. It should be noted that the average inclination can be obtained when turning the wheels of the vehicle 360 degrees or using mathematical modeling and analyzing changes by the control program, by turning wheels at an angle less than 360 degrees. Based on mutual angles between vehicle wheel planes, and known mutual angles between wheel planes and the reference plane, basic wheel alignment angles are found as described further herein. Based on mutual angles between wheel planes and the reference plane, and taking into account the known inclination of the reference plane, wheel plane inclination to horizon level is found, this plane inclination of each wheel plane being the camber for each appropriate wheel. Additionally, based on the calculation of the mutual position of each axle's wheels' planes to the direction of vehicle rectilinear motion, the total toe values of the axles are determined, as mutual axle wheel plane angle to vehicle rectilinear motion. Each wheel's individual toe is found after determining the angle of the reference line of the reference plane. For vehicles with non-regulated rear toe alignment, this is a line passing through the point of alignment of the rear wheels and the center of the rear axle (thrust line) and is calculated by geometric constraints, just as a regulation line may be adopted by averaged admissions in consideration of mutual wheel plane values. Also, others methods of reference line defending are applied if mutual wheel planes and absolute wheel plane inclination values are allowed.

After adjusting wheel sensors mounted on the wheels and determining the wheel plane in space, the wheel plane is continuously monitored by wheel sensors when measuring and adjusting wheel alignment taking into account the described compensation.

When turning the steering wheel of a vehicle, front wheel steering axle caster and steering wheel axle tilt angle are calculated using well-known methods based on changes in wheel plane inclination in accordance with the turning angle of the steering wheel.

In some embodiments, an additional sensor (or sensors) similar to the wheel sensors design may be used in same time with others system sensors, which is installed on the vehicle frame during the measurements and provided the mutual angle between the reference plane and an additional sensor. In this case, the angles of the wheels planes can be calculated relative to the vehicle's frame or the calculation of the angles can be combined with the procedures described above.

In some embodiments, the initial inclination angles is determined during the wheel sensors installation on the installation locations of the reference surface by using one or a set of inclinometers and/or accelerometers included in the wheel sensors.

In general, the wheel alignment determination system of the vehicle comprises four wheel sensors 6 (additional sensors similar to wheel sensors can be used), the reference plane 7 (which is not part of the vehicle), a computer/processing unit 10 and a receiving-transmitting device 8.

Wheel sensors comprise gyroscopic sensors or angular rate sensors or gyroscopic MEMS angular rate sensors (MEMS gyroscopes), which measure the angle in at least two orthogonal planes, thus allowing to uniquely determine the changes in the wheel sensor plane (where the wheel sensor plane angle is a virtual plane formed by at least two vectors in space originating from one point that is used by the program to calculate angular parameters for measurements). The composition of the sensors may include a set of inclinometers and/or accelerometers for compensation or determining errors of gyroscopic sensors accumulated during the measurement. The composition of the sensors may further comprise one or a set of inclinometers and/or accelerometers to define the initial inclination angles during the wheel sensors installation on the installation locations of the reference surface. The reference plane is a precision surface with special mounting sites, which is not part of the measured vehicle and is not connected with it mechanically. Wheel sensors are mounted on the mounting sites of the reference plane, wherein the wheel sensors can be oriented by their position at the installation locations and system recording initial angles values. Mounting sites have a known orientation relative to the reference plane and to each other. Initial angles are predetermined values of mutual wheel sensors' angles. The reference plane, in some embodiments, also comprises a set of inclinometers and/or accelerometers that are fixed to the reference plane to determine inclination.

Figure 6:
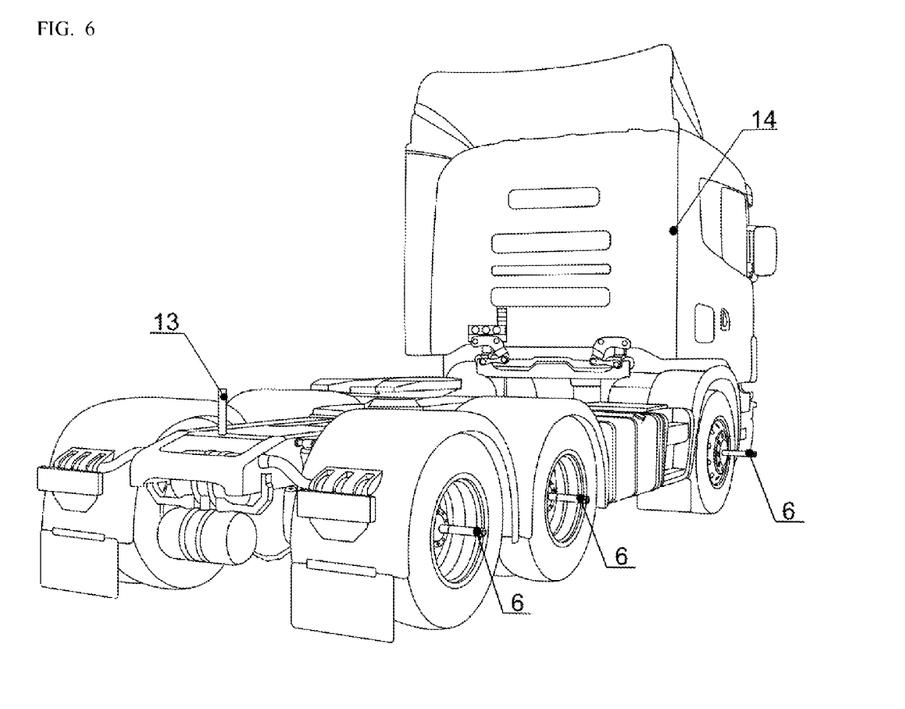
FIG. 6 shows another overall view of the vehicle wheel 11 alignment determination system as described herein, with wheel sensors 6 mounted on a vehicle and additional sensor 13 mounted on a vehicle 14 frame.

In some embodiments, an additional sensor 13 (or sensors) similar to the wheel sensors design may be used in same time with others system sensors, which is installed on the vehicle frame during the measurements and provided the mutual angle between the reference plane and an additional sensor. In this case, the angles of the wheels' planes are calculated relative to the vehicle's 14 frame or the calculations of the angles are combined with the procedure described above.

The receiving-transmitting device 8 is designed for data exchange via a wire or radio communication channel between the computer, the reference plane, and the wheel sensors.

The computer is designed for system management and execution of measurement algorithms.

The fundamental difference from the systems disclosed in U.S. Pat. No. 5,038,485 is that: in the present method and system, all wheel sensors for one or more vehicle axles are set simultaneously to the reference plane, and further calculation of the angles is performed simultaneously, wherein all the sensors take into account the sensors' mutual position, so the measurement and/or adjustment of all wheels is performed simultaneously. Thus, it is not necessary to separately adjust alignment angles of each wheel sensor or separately initialize a sensor before measuring. Calculation of the angles of alignment is based on the relative position of the vehicle wheel sensors (or relative position of the vehicle sensors and sensors on the frame of the vehicle).

The fundamental difference from the systems disclosed in U.S. Pat. No. 7,089,150 B2 and U.S. Pat. No. 7,324,916 is that: in the present method and system, to determine the initial position of the wheel sensors, a reference plane is used, which is a precision surface with places for the installation of wheel sensors, wherein the reference plane is not part of the vehicle and is designed to set a common reference plane for all system sensors. All wheel sensors for one or more vehicle axles are set simultaneously on the reference plane and further calculation of the angles is performed simultaneously on all the sensors taking into account the sensors' mutual position, so the measurement and/or adjustment of all wheels is performed simultaneously and it is not necessary to separately adjust alignment angles of each wheel sensor or separately initialize a sensor before measuring. Calculating the angles of alignment is based on the relative position of the vehicle wheel sensors (or the relative position of the vehicle sensors and sensors on the frame of the vehicle). Also, the reference plane is not attached to the vehicle, with respect to which the alignment is regulated.

EXAMPLE

The basic requirements for the presently claimed method and system are four sensors, a reference plane, and a computer, which contains programming for processing all mathematical algorithms and showing results in the display.

Figure 1:
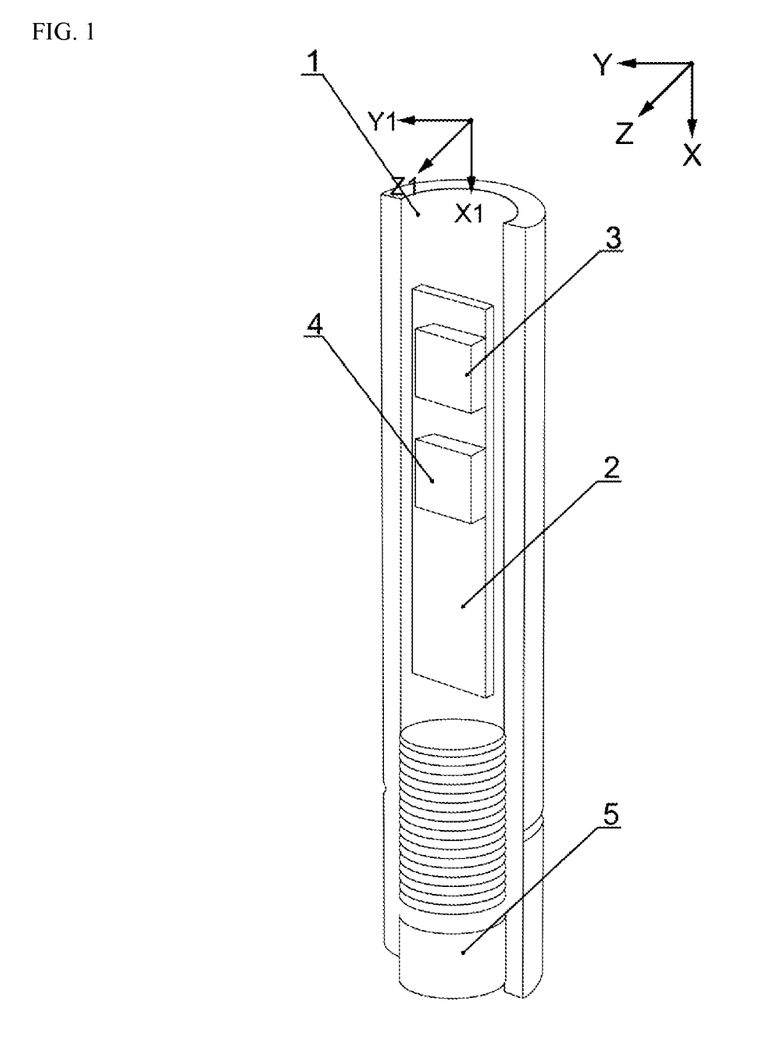
FIG. 1 shows sectional drawing of an example of a wheel sensor assembly. The assembly consists of the following elements: plastic tube 1; sensor electronic circuit 2; sensor MEMS gyroscope 3; sensor MEMS accelerometer 4; magnet 5.
Figure 3:
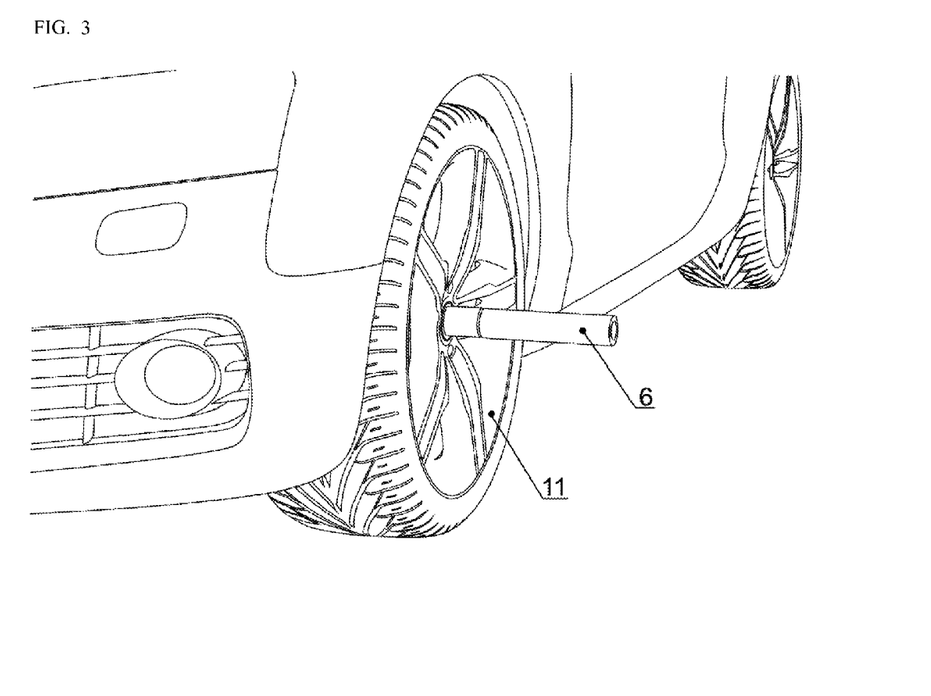
FIG. 3 shows an example of how to mount a wheel sensor with a wheel hub nut. The figure consists of the following elements: wheel sensor 6; vehicle wheel 11.
Figure 4:
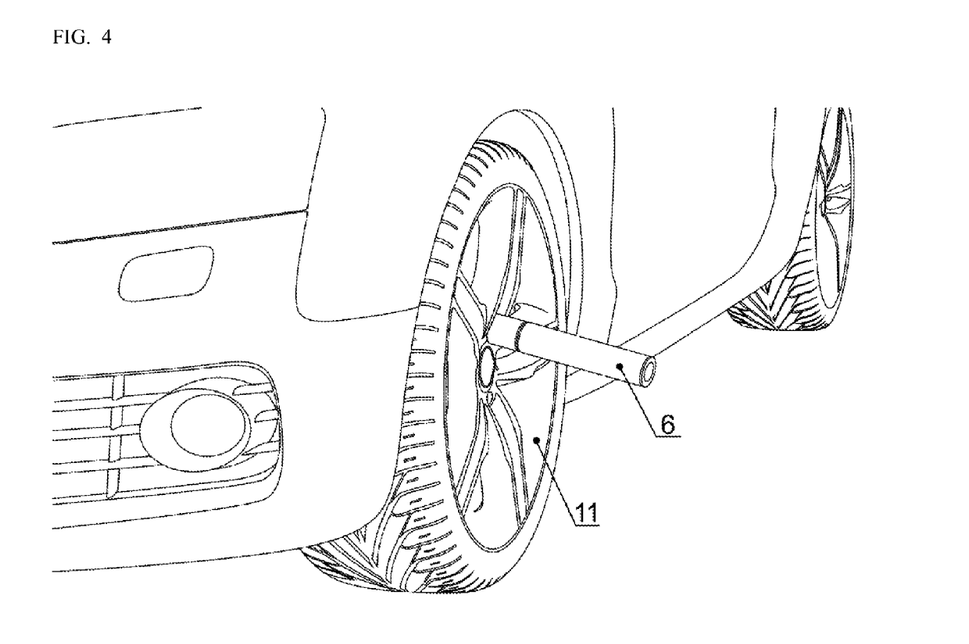
FIG. 4 shows an example of how to mount a wheel sensor with a wheel nut. The figure consists of the following elements: wheel sensor 6; vehicle wheel 11.
Figure 5:
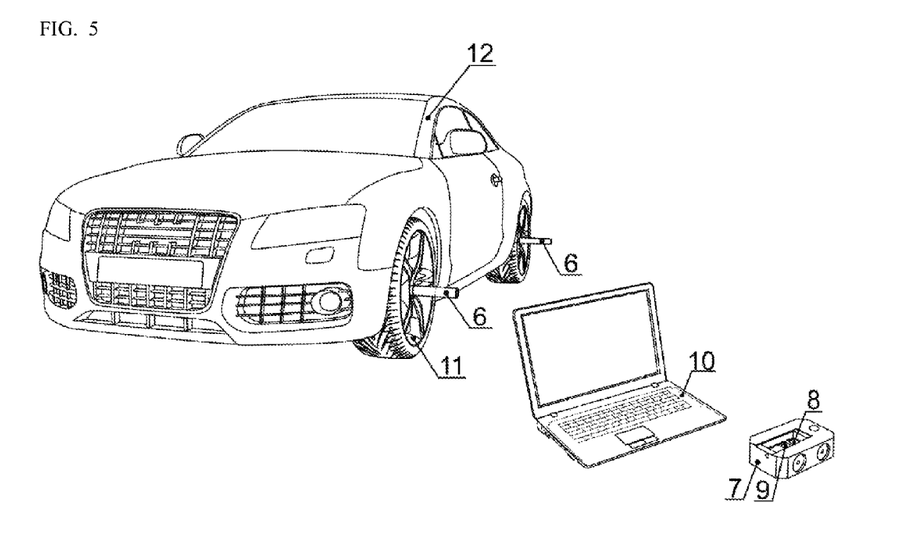
FIG. 5 shows a larger overall view of the vehicle wheel 11 alignment determination system described herein, with the wheel sensors 6 mounted on the vehicle 12. The figure also comprises a reference plane 7, the reference plane electronic circuit with transmitting device 8, reference plane MEMS accelerometer 9 and computer 10.

The wheel sensor (6), in this example, an angular sensor, consists of a tube (1), inside of which is an electronic circuit (2) with a magnet (5). The magnet (5) is located on the tube end and is required for attaching the sensor (6) to the central wheel nut (FIG. 3) or the wheel's (11) fixing bolts (FIG. 4). The electronic circuit (2) is a microprocessor device comprising: a MEMS gyroscope (3), an MEMS accelerometer, (4) and a scheme to provide radio communication with the computer.

Moreover, despite the possibility of application of any type of gyroscopic sensors to the present system, MEMS gyroscopes are more convenient to use in these systems due to their low weight and ease of processing of digital signals generated. MEMS gyroscopes are angular rate sensors and, in addition to the mass produced MEMS acceleration sensors, allow to fully control inertial movement. As a result of improved production technologies, as well as cost reduction and miniaturization of gyroscopes, the prospects of their industrial and consumer applications have grown. MEMS gyroscopes combine a MEMS unit, which transforms the controlled parameter into a change in electric capacitance, and an application-specific integrated circuit (ASIC), which tracks the changing capacitance and generates an output signal. A MEMS gyroscope designed as a unit is a tuning fork type device. Its principle of operation is based on the Coriolis effect when rotating two silicon masses that produce fluctuations of equal amplitude but in opposite directions. The Coriolis force causes an orthogonal vibration, which leads to the displacement of fluctuating masses from the plane. The higher the angular speed the greater the displacement. This offset is controlled by the ASIC chip as a change in electric capacitance. MEMS gyroscopes can control rotation relative to one or several axes, relative to the longitudinal X axis (roll axis), transverse Y axis (pitch axis) and vertical Z axis (yaw axis). It should be noted that such sensors control the angular (rotational) velocity. Thus, in order to determine the controlled via the wheel sensors axle angles changing, the system must constantly integrate the angular velocity readings.

The microprocessor continuously receives data from the gyro and accelerometer for sensor orientation tracking. The sensor stores in its memory a quaternion that shows its orientation relative to initial point, and as well based on this information sensor orientation relative to other system sensors can be calculated. One accelerometer 8 or set can be rigidly attached to a reference plane (7) and based on known mutual position of reference plane and system wheel sensors initial information for them can be calculated without accelerometers on scheme. This data are requested from the computer, which produces further processing. Thus the sensor acts as a simple inertial navigation system. Inertial navigation is a self-contained navigation technique in which measurements provided by accelerometers and gyroscopes are used to track the position and orientation of an object relative to a known starting point, with known orientation and velocity. Inertial measurement unit (IMUs) typically contains three orthogonal rate-gyroscopes and three orthogonal accelerometers, measuring angular velocity and linear acceleration respectively. By processing signals from these devices it is possible to track the position and orientation of a device. In this case the known starting point is an initial predetermined startup position of a sensor on the reference plain in the beginning of the test and as well based on this information sensor orientation relative to other system sensors.

The electronic circuit (2) of wheel sensor (6) uses high-precision and low-noise digital gyroscope and accelerometer. Each MEMS sensor contain 16-bit analogue to digital converter (ADC), from which the data are transmitted to the microprocessor for processing.

Although the low-noise MEMS sensors are used, direct data from them cannot be used for updating the mathematical model of the wheel sensor. For such data, digital filtering is required. In this Microcontroller Unit (MCU) program (hereinafter the "program") the one-dimensional sliding median filter is used for MEMS output data (VAI' AND Z., SEKANINA L.: 'Novel hardware implementation of adaptive median filters'. Proc. IEEE Workshop Design and Diagnostics of Electronic Circuits and Systems, 2008, pp. 110-115).

The median filter is a highly versatile non-linear filter that has been used extensively in a variety of domains. Its strength lies in its ability to filter out noise while minimally affecting the properties of the underlying signal. The median filter replaces a sample with the middle ranked value among all the samples within the sample window. In this manner, it filters out samples that are not representative of their surroundings; in other words, outliers. The use of a linear filter (such as a Gaussian or mean filter) in this situation causes a powerful high-frequency interference or strong surge distort data for a considerable period. Thus far, the system takes a sequence of samples and returns the median for a fixed window, once it has been filled. Such an algorithm, however, is not useful, since normally the median must be computed for a sliding window. This means that, in each cycle, the window moves one sample down the sequence, discarding the oldest sample and adding the newest into the window. To implement this algorithm for sliding windows, some changes are made. Consider that now while constructing a histogram, with each new sample that enters, the oldest sample is removed from the window, and thus its effect on the histogram must also be negated. This, however, only happens after the window has become full. Hence some way of keeping track of the old samples, knowing when the window has become full for the first time, and some way of updating the histogram based on the new and oldest samples need be devised.

Before using data from a sensor, noise for gyro and accelerometer signals must be avoided or removed. Also, for the gyro, a fixed zero-rate level is required. Gyro and accelerometer data presented three-dimensional vectors of integers. The vector of the instantaneous value of the accelerometer is vector $G_m$ (gravity), and the gyro is vector $R_m$ (<<rotation>> velocity) (Equation 0).

$$G_m = \begin{bmatrix} G_x \\ G_y \\ G_z \end{bmatrix}; R_m = \begin{bmatrix} R_x \\ R_y \\ R_z \end{bmatrix}; \quad \text{(Equation 0)}$$

When the wheel sensor is starting up, the program performs a quick calibration. Quick calibration is the same for request by a managing computer program. During quick calibration, the program obtains 200 samples of accelerometer and gyroscope. Using the values of these arrays of samples, the program calculating thresholds noise as maximum absolutes values. Level zero gyro ($R_0$) in all three coordinate axes is read from memory device (from device settings). These settings are written to the device during sensors calibration.

A mathematical model of the wheel sensor is a model of a solid body with a local three-dimensional orthogonal coordinate system. The solid body is a cylinder (1) with the center coordinates in the center of mass of the body and the X-axis is directed along the cylinder.

Figure 2:
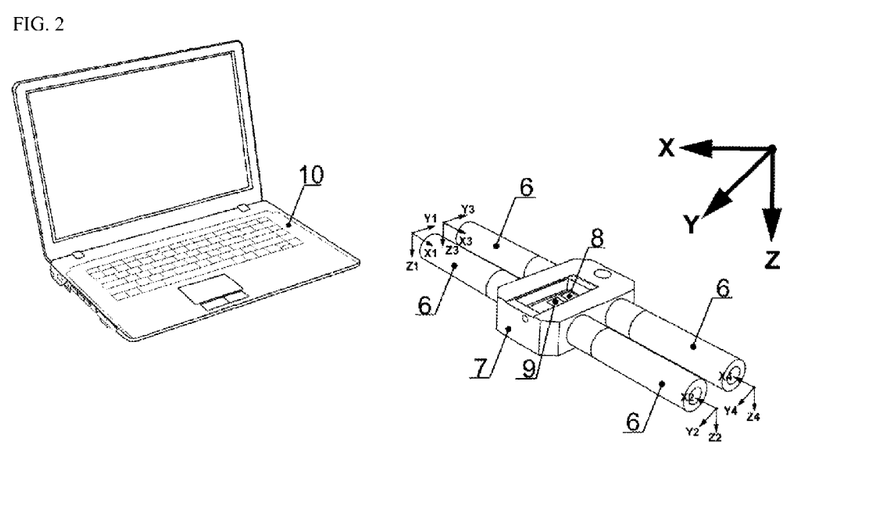

FIG. 2 shows the global (or world) coordinate axes and local axis. Rotating the local axes relative to the global axes determined by the quaternion ($Q_s$) in the mathematical model of the sensor on a wheel. To simplify, the quaternion is represented as a matrix, as shown by Equation 1:

$$Q_s = \begin{bmatrix} w \\ x \\ y \\ z \end{bmatrix} = \begin{bmatrix} Q_{s_0} \\ Q_{s_1} \\ Q_{s_2} \\ Q_{s_3} \end{bmatrix}; \quad \text{(Equation 1)}$$

To increase the accuracy and stability of the algorithm, MARG is applied (Mingjian Li, Chen Chen, Ning Han, Fei Yan: An attitude error correction method based on MARG sensor array). MARG is based on steepest descent method and complimentary filter theory. The present invention comprises use of ground magnetic and gravity field observations to correct the attitude error of the gyroscope. To evaluate the performance of the proposed algorithm, gyro/accelerometer/magnetometer integrated navigation simulation experiment and MARG/turntable experiment are carried out. Experimental results show superior performance of the method over the traditional Quaternion extended Kalman filter (QKF) method.

Before the start of the algorithm for quaternion updating, some constants are defined and some values are initialized:

$K_\beta$=0.16 (algorithm gain), $\Delta_t$=0.009 (9 milliseconds), $KS_\beta$=1 (starting value), $$Q_s = \begin{bmatrix} 1 \\ 0 \\ 0 \\ 0 \end{bmatrix} \text{ (basis quaternion)}$$

Quaternion is updated each time the data is obtained from the gyroscope: $\Delta_t$=0.009. seconds. Quaternion update is made via several steps. In the first step the accelerometer and gyroscope data are multiplied by the scale factor and converted to a floating point value matrix (Equation 2). Matrices $R_{sc}$ and $G_{sc}$ obtained from the specifications of the sensors chips used and their components are significant: 0.00875 and 0.06. Multiplier values ($R_{sc}$ and $G_{sc}$) for the gyro and accelerometer are read from the device settings. These values are recorded in the setting of the calibration devices on the bench.

$$G_f = G_m * G_{sc} \quad \text{(Equation 2)}$$

$R_f = (R_m - R_0) * R_{sc}$, or $$\begin{bmatrix} G_{fx} \\ G_{fy} \\ G_{fz} \end{bmatrix} = \begin{bmatrix} G_{mx} \\ G_{my} \\ G_{mz} \end{bmatrix} \begin{bmatrix} G_{scx} & 0 & 0 \\ 0 & G_{scy} & 0 \\ 0 & 0 & G_{scz} \end{bmatrix}$$

$$\begin{bmatrix} R_{fx} \\ R_{fy} \\ R_{fz} \end{bmatrix} = \begin{bmatrix} R_{mx} - R_{0x} \\ R_{my} - R_{0y} \\ R_{mz} - R_{0z} \end{bmatrix} \begin{bmatrix} R_{scx} & 0 & 0 \\ 0 & R_{scy} & 0 \\ 0 & 0 & R_{scz} \end{bmatrix};$$

In first time $\vec{Q_s}$ is a basis quaternion and $K_\beta$ let equals to $KS_\beta$. This makes it possible to quickly align the physical position of the device and its mathematical model. The next step is normalizing accelerometer vector and produced gradient descent correction:

$$\vec{G_f} = \frac{\vec{G_f}}{\|\vec{G_f}\|}.$$

Now $G_f$ is normalized. The quaternion error function is defined as follows: $f_e(\vec{Q_s}, \vec{G_f}) = \vec{Q_s}' \otimes \vec{G_f} \otimes \vec{Q_s}$ and $\nabla f_e(\vec{Q_s},$ $\vec{G_f} = J^T(\vec{Q_s})f_e(\vec{Q_s}, \vec{G_f})$, wherein $\nabla f_e$ indicates gradient of the objective function, and J is the Jacobian matrix.

The objective function $f_e$ and its Jacobian matrix can be formulated as Equation 3 and Equation 4:

$$f_e(\vec{Q_s}, \vec{G_f}) = \begin{bmatrix} 2(Q_{s1}Q_{s3} - Q_{s0}Q_{s2}) - G_{fx} \\ 2(Q_{s0}Q_{s1} + Q_{s2}Q_{s3}) - G_{fy} \\ 2(0.5 - Q_{s1}^2 - Q_{s2}^2) - G_{fz} \end{bmatrix};$$ (Equation 3)

$$J(\vec{Q_s}) = \begin{bmatrix} -2Q_{s2} & 2Q_{s3} & -2Q_{s0} & 2Q_{s1} \\ 2Q_{s1} & 2Q_{s0} & 2Q_{s3} & 2Q_{s2} \\ 0 & -4Q_{s1} & -4Q_{s2} & 0 \end{bmatrix};$$ (Equation 4)

The corrective step vector is then calculated and normalized via the following formulas: $\vec{S_\Delta} = J(\vec{Q_s}) * f_e(\vec{Q_s}, \vec{G_f})$;

$$\vec{S_\Delta} = \frac{\vec{S_\Delta}}{\|\vec{S_\Delta}\|}.$$

If the position of the device does not comply with its mathematical model (not initialized), the $K_\beta$ is equals to $KS_\beta$. In this case, and at this stage, a program compares module $\vec{S_V}$ with constant precision epsilon. If the module is less than or equal to epsilon, then the device is considered to be initialized and the value $K_\beta$ is set equal to the value of the device settings. An epsilon constant value is set to 0.00001.

Followed by computation of the rate of change of quaternion (Equation 5):

$$\vec{Q_\Delta} = \frac{\vec{Q_s} \text{prod} \begin{bmatrix} 0 \\ R_{fx} \\ R_{fy} \\ R_{fz} \end{bmatrix}}{2} - K_\beta * \vec{S_\Delta};$$ (Equation 5)

Followed by integrating to yield quaternion and normalizing it:

$$\vec{Q_s} = \vec{Q_s} + \vec{Q_\Delta} * \Delta_t \quad \vec{Q_s} = \frac{\vec{Q_s}}{\|\vec{Q_s}\|};$$ (Equation 6)

This yields a final quaternion in current iteration. This quaternion is transmitted to the personal computer for the next processing. In the case where corresponding wheel and sensor planes are parallel, the angle of mutual wheels' planes can be accepted as mutual sensor mathematic model planes, based on final quaternions in current iteration. Otherwise, the angle between corresponding wheel and sensor mathematic model planes must be defined for finding angle of mutual wheels' planes. This is done during rolling vehicle in its rectilinear motion. In procedure of rolling the vehicle in its rectilinear motion, based on the relation of the changes in the sensors planes inclination, wheel inclination plane is calculated as average value and wheel disc curve (runout) also could be adjusted based on the dependence of changes in sensors plane inclination.

The program on the computer manages the wheel sensors by radio or other known methods. The program, at key moments, obtains information about the position of each sensor. The process of testing the vehicle wheel alignment is split into several phases. These phases are: (1) Calibration of wheel sensors relative to an initial position on a reference plane; (2) Installation of sensors on the wheels; (3) Rolling wheels; (4) Calculation of the characteristics of wheel position: camber and toe angles; (5) Calculation of caster; and (6) Tracking of wheel position during wheel alignment adjustment.

At the beginning of the test, an operator sets sensors on the reference plane and fixes them still. The program gives the command to reset the sensors. When you reset the sensors quaternions are initialized by the accelerometer. If the sensors do not move, their local coordinate systems will be similar. Basis vectors for these coordinate systems are collinear. This is because after all sensors receive a reset command, their quaternions are equal (FIG. 2).

Thus, these coordinate systems in initial position can be taken together as one. Also, the inclination of each wheel sensor is stored for future algorithmic processing from an accelerometer which is attached to the reference plane or otherwise included in the composition of the wheel sensors.

After all the sensors are installed on the reference plane and they are initialized, the program requests that the operator mount sensors on the wheels. The operator then couples sensors to the wheels.

Since the geometrical and physical properties of the sensor in the process of moving it to the wheels do not change, there is a movement of parallel translation and rotation. Center coordinates of each of the sensors also do not change during such movement because the physical properties are not changed.

Rolling wheels are required for correcting distortions made of roughness mounting and disk curve compensation. Disk curve and distortions made of roughness mounting can be compensated for averaged results, which must be taken into account for total wheel alignment adjustments. Rolling the vehicle in its rectilinear motion, based on the relation of the changes of the plane inclination of the sensors, wheel inclination plane is calculated and wheel disc curve (runout) and distortions made of roughness mounting is adjusted based on the dependence of changes in plane inclination of wheel sensors as average inclination results during 360 degrees each wheels rolling. It should be noted that the range of projections of wheel sensor plane inclination to the horizontal surface can be obtained when turning the wheels of the vehicle 360 degrees or using mathematical modeling by the control program, by analyzing changes, by turning wheels at an angle less than 360 degrees.

If sensors correctly mounted on the wheel, the rotation occurs mostly around the X-axis of the local coordinates. As described above, the transfer of sensors with reference plane on wheels—a parallel translation and rotation. Bases of local coordinate systems and their centers are unchanged. All system wheel sensors are marked with correspondents to certain vehicle wheels. All system wheel sensors at initial position have collinear basis vectors in local coordinate system. Thus after wheel sensors are mounted on the proper wheels, basis on MEMS gyro angles tracking, calculations of vectors angles to initial position or to other wheel sensors vectors is performed.

Figure 7:
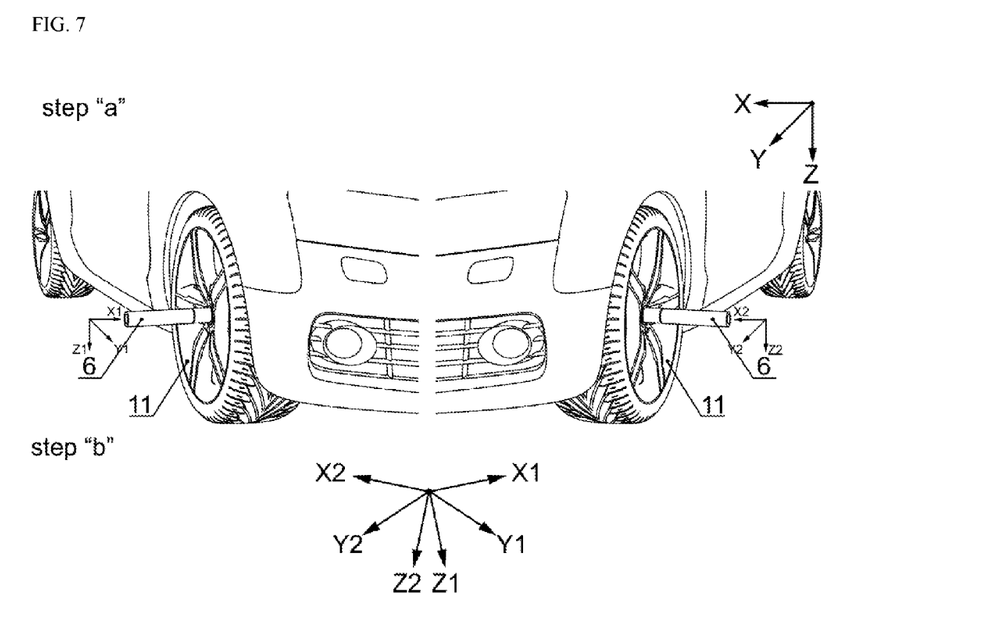
FIG. 7 shows a virtual illustration of combined of two coordinate systems of two coaxial wheel sensors. The figure comprises wheel sensors 6 and a vehicle wheels 11 of both sides of tested vehicle.

FIG. 7 demonstrates how to superimpose two coordinate systems of two coaxial sensors for future total toe definition on axle. All movements are pictured only to demonstrate the principle and do not exist in the real procedure. Step "a"

shows the initial position of wheel sensors after they are mounted on the wheels. Mutual position of three orthogonal unit vectors of wheel sensors calculated from mutual position of each sensor and collinear basis vectors in initial position on reference plane, as described above. Step "b" the beginning of orthogonal unit vectors of the left wheel sensor combined with beginning of orthogonal unit vectors of the right wheel sensor. Then the program takes one of the sensors coordinate system as a basic.

To simplify the presentation in this example, calculations for only one pair of coaxial wheels are described. These wheels are driven (steering and front).

As described above, with all sensors, the program determines normalized quaternions.

In this simplified case, there are two quaternions for wheel sensors in the mounted (final) position. Notation: $Q_l$—left wheel, $Q_r$—right wheel.

$$\overline{Q_r} = \begin{bmatrix} w_r \\ x_r \\ y_r \\ z_r \end{bmatrix};$$ (Equation 7)

$$\overline{Q_l} = \begin{bmatrix} w_l \\ y_l \\ z_l \\ w_l \end{bmatrix};$$ (Equation 8)

The rotation matrix is obtained from the quaternion (Equations 7 and 8) by the following formula (Equation 9):

$$R = \begin{bmatrix} x^2+y^2-z^2-w^2 & 2yz-2xw & 2yw+2xz \\ 2yz+2xw & x^2-y^2+z^2-w^2 & 2zw-2xy \\ 2yw-2xz & 2zw+2xy & x^2-y^2-z^2+w^2 \end{bmatrix};$$ (Equation 9)

From the rotation matrices, the first row is pulled, which is a unit vector $\overrightarrow{OX}$ of the local coordinate system wheel sensors. To the right and left wheels: $\overrightarrow{OX_r}$ and $\overrightarrow{OX_l}$.

If these vectors are placed in one coordinate system, looking at their projections on the coordinate plane XY—the total toe angle is available for calculation. $\theta_{tt}$ is a total toe angle. $\overrightarrow{OXR_{xy}}$ and $\overrightarrow{OXL_{xy}}$ are the projections of the right and left wheels unit vectors $\overrightarrow{OX}$ on the plane XY and $\overrightarrow{OXR_x}$ and $\overrightarrow{OXL_x}$ are the X components of this vectors. All $\overrightarrow{OX}$ vectors coordinates replaced by their absolute values.

$$\overrightarrow{OXR_{xy}} = \overrightarrow{OX_r} * \begin{bmatrix} 1 & 0 & 0 \\ 0 & 1 & 0 \\ 0 & 0 & 0 \end{bmatrix}$$ (Equation 10)

$$\overrightarrow{OXL_{xy}} = \overrightarrow{OX_l} * \begin{bmatrix} 1 & 0 & 0 \\ 0 & 1 & 0 \\ 0 & 0 & 0 \end{bmatrix};$$

$$\overrightarrow{OXR_x} = \overrightarrow{OX_r} * \begin{bmatrix} 1 & 0 & 0 \\ 0 & 0 & 0 \\ 0 & 0 & 0 \end{bmatrix}$$

$$\overrightarrow{OXL_x} = \overrightarrow{OX_l} * \begin{bmatrix} 1 & 0 & 0 \\ 0 & 0 & 0 \\ 0 & 0 & 0 \end{bmatrix}$$

The angle between the two vectors shown in Equation 11 is calculated by the following formula (angle in radian):

$$\theta_r = \cos^{-1}\left(\frac{\overrightarrow{OXR_{xy}} \, dot \, \overrightarrow{OXR_x}}{|\overrightarrow{OXR_{xy}}||\overrightarrow{OXR_x}|}\right);$$ (Equation 11)

$$\theta_l = \cos^{-1}\left(\frac{\overrightarrow{OXR_{xy}} \, dot \, \overrightarrow{OXR_x}}{|\overrightarrow{OXR_{xy}}||\overrightarrow{OXR_x}|}\right); => \theta_{toe} = \pi - \|\theta_l - \theta_r\|$$

Each wheel's individual toe is found after determining the angle of the reference line. For vehicles with non-regulated rear toe alignment, this is a line passing through the point of alignment of the rear wheels and the center of the rear axle (thrust line) and is calculated by geometric constraints, just as a regulation line may be adopted by averaged admissions in consideration of mutual wheel planes values. Also others methods of reference line defending may be applied if mutual wheel planes and absolute wheel plane inclination values are allowed.

In case the tested vehicle is located on leveled horizontal surface then the camber angles are found as the angles between the vectors $\overrightarrow{OX_l}$, $\overrightarrow{OX_r}$ and the XY plane by using appropriate trigonometric transforms of the rotation matrices corresponding $\overrightarrow{OX}$ component:

$$Cl = \sin^{-1}(\overrightarrow{OX_l}[z]); \quad Cr = \sin^{-1}(\overrightarrow{OX_r}[z]);$$ (Equation 12)

The caster measurement procedure applied to each steer the wheel to two toe angles, T1 and T2, where respective camber measurements, C1 and C2, are made (January, D., 'Steering Geometry and Caster Measurement,' SAE Technical Paper 850219, 1985, doi:10.4271/850219):

$$K \approx \tan^{-1}\left(\frac{\sin C_2 - \sin C_1}{\sin T_2 - \sin T_1}\right);$$ (Equation 13)

A final restriction is made that the caster turn must be symmetric about the trust line of the non-steerable rear wheels, that is, T2=−T1.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for determining a vehicle's wheel alignment, comprising:
   placing at least two angular sensors on sensors' mounting sites located on a reference plane (with a known mutual orientation of sensors' mounting sites), each angular sensor measuring an angle change in at least two of three, X, Y and Z, orthogonal coordinate axes;
   recording values of at least two (in X,Y or X, Z or Y,Z) reference angles of each sensor, the at least two reference angles showing a relative position of each sensor to a known common plane of the reference plane;
   based on the relative position of the sensors to the known common plane, calculating relative angles between the sensors in at least two orthogonal coordinate axes (in X,Y or X, Z or Y,Z);
   removing the sensors from the reference plane, the reference plane being disconnected from the vehicle, and placing the sensors on the wheels of the vehicle, wherein one sensor is located on each measured wheel;
   and based on the sensors' measured angles change, calculating a relative angular position of the sensors, thus determining the vehicle's wheel alignment.

2. The method of claim 1, wherein the sensors are gyroscopic sensors.

3. The method of claim 1, wherein the sensors are angular rate sensors, the sensors performing an angular rate measurement continuously starting from removal from the reference plane to placement on the wheels, and further comprising processing the angular rate measurement to perform a continuous integration of angles over time thus obtaining a current angular position of the sensor relative to a starting position.

4. The method of claim 3, wherein the processing unit is positioned inside the sensor.

5. The method of claim 3, further comprising transmitting wirelessly an angle change measurement data to a remotely located processing unit.

6. The method of claim 1, further comprising:
   placing at least one inclinometer on the reference plane;
   measuring an inclination of the known common plane of the reference plane relative to the Earth's surface;
   based on a known relative position of the sensors to the common plane, calculating starting point inclination angles of each sensor on the reference plane to the Earth's surface;
   after placing the sensors on the wheels, based on the sensors' measured angle change relative to starting point inclination angles, calculating and recording a wheel inclination relative to the Earth's surface (camber).

7. The method of claim 6, wherein each sensor has an inclinometer to define its starting point inclination angle during the sensor's positioning on the reference plane.

8. The method of claim 1, further comprising at least one additional frame sensor; the frame sensor being the same type as other sensors;
   the frame sensor being initially placed on the reference plane simultaneously with other sensors;
   recording values of at least two (in X,Y or X, Z or Y,Z) reference angles for the frame sensor, the at least two reference angles showing a relative position of the frame sensor to a known common plane of the reference plane;
   based on the relative position of the sensors to the common plane, calculating relative angles between the frame sensor and other sensors in at least two orthogonal coordinate axes (in X,Y or X, Z or Y,Z);
   removing the frame sensor from the reference plane and placing it onto a vehicle frame;
   based on the frame sensor's and other sensors' measured angle changes, calculating a relative angular position of the frame sensor and other sensors, thus determining the vehicle's wheel alignment in reference to the vehicle frame.

9. A device for determining a vehicle's wheel alignment, comprising:
   at least two angular sensors for placement on sensors' mounting sites located on a reference plane (with a known mutual orientation of sensors' mounting sites), each angular sensor measuring an angle change in at least two of three, X, Y and Z, orthogonal coordinate axes;
   a storage unit for recording values of at least two (in X,Y or X, Z or Y,Z) reference angles of each sensor, the at least two reference angles showing a relative position of each sensor to a known common plane of the reference plane;
   a processing unit for calculating relative angles between the sensors in at least two orthogonal coordinate axes (in X,Y or X, Z or Y,Z) based on the relative position of the sensors to the known common plane,
   wherein the sensors are removed from the reference plane and placed on the wheels of the vehicle, wherein one sensor is located on each measured wheel;
   and wherein, based on the sensors' measured angle change, the processing unit calculates and records in the storage unit a relative angular position of the sensors, thus determining the vehicle's wheel alignment.

10. The device of claim 9, wherein the sensors are gyroscopic sensors.

11. The device of claim 9, wherein the sensors are angular rate sensors, the sensors performing an angular rate measurement continuously starting from removal from the reference plane to placement on the wheels, and wherein the processing unit further performs a continuous integration of the angle over time thus obtaining a current angular position of the sensor relative to a starting position.

12. The device of claim 11, wherein the processing unit is positioned inside the sensor.

13. The device of claim 11, further comprising a transmitting unit for transmitting wirelessly an angle change measurement data to a remotely located processing unit.

14. The device of claim 9, further comprising at least one inclinometer on the reference plane.

15. The device of claim 14, further comprising at least one inclinometer on at least one sensor.

16. The device of claim 9, further comprising at least one additional frame sensor, the frame sensor being the same type as other sensors;
   the frame sensor being initially placed on the reference plane simultaneously with other sensors;
   the storage unit recording values of at least two (in X,Y or X, Z or Y,Z) reference angles for the frame sensor, the at least two reference angles showing a relative position of the frame sensor to a known common plane of the reference plane;
the processing unit calculating relative angles between the frame sensor and other sensors in at least two orthogonal coordinate axes (in X,Y or X, Z or Y,Z) based on the relative position of the sensors to the common plane;
wherein the frame sensor is then removed from the reference plane and placed onto a vehicle frame;
and based on the frame sensor's and other sensors' measured angle changes, the processing unit further calculates and records in the storage unit a relative angular position of the frame sensor and other sensors, thus determining the vehicle's wheel alignment in reference to the vehicle frame.

* * * * *